United States Patent

[11] 3,604,465

| [72] | Inventor | Rudolf Schetty |
| | | Basel, Switzerland |
| [21] | Appl. No. | 710,850 |
| [22] | Filed | Mar. 6, 1968 |
| [45] | Patented | Sept. 14, 1971 |
| [73] | Assignee | Basler Stuckfarberei AG, Badenstrasse |
| | | Basel, Switzerland |
| [32] | Priority | Mar. 22, 1967 |
| [33] | | Switzerland |
| [31] | | 4329/67 |

[54] PIPE CONSTRUCTION
8 Claims, 2 Drawing Figs.

| [52] | U.S. Cl. | 138/177 |
| [51] | Int. Cl. | F16l 9/12 |
| [50] | Field of Search | 138/172, 173, 174, 175, 176, 177, 178, 141; 264/DIG. 53, 310, 311 |

[56] References Cited
UNITED STATES PATENTS

| 2,862,806 | 12/1958 | Nestor | 264/311 X |
| 2,874,412 | 2/1959 | Flemming et al. | 264/311 |
| 2,887,728 | 5/1959 | Usab | 264/311 X |
| 2,993,235 | 7/1961 | Brown et al. | 264/311 X |
| 2,994,919 | 8/1961 | Schafer et al. | 264/311 X |
| 3,150,219 | 9/1964 | Schmidt | 264/311 X |
| 3,290,426 | 12/1966 | Barrentine | 138/177 X |
| 2,305,017 | 12/1942 | Lewis | 138/141 |

*Primary Examiner*—Houston S. Bell, Jr.
*Attorney*—McGlew and Toren

ABSTRACT: A pipe construction includes a plastic bonded filling material wherein at least one constituent of the filling material is varied in amount in a radial direction over at least a part of the pipe wall thickness. The pipe is made by supplying a filling material to a rotating mold in successive strokes along the mold axis in addition to a plastic material which is supplied continuously to the mold; and varying at least one constituent of the filling material during at least some of successive strokes as the wall thickness of the pipe is being formed.

PATENTED SEP 14 1971 3,604,465

INVENTOR.
RUDOLF SCHETTY
BY
McGlew & Toren
ATTORNEYS

PIPE CONSTRUCTION

SUMMARY OF THE INVENTION

This invention relates in general to a pipe construction and method of making a pipe and in particular to a new and useful pipe of a plastic material having a filler which is varied in quantity in a radial direction of the wall thickness of the pipe and to a method for forming the pipe in a rotating mold wherein the filler is added to a plastic material continuously supplied to the mold in a manner such that the filler quantity is varied as the thickness of the wall is formed.

It is known practice to design pipes which are to be laid in the ground, for example as sewage pipes in sewage systems, as annular bodies of radially limited elasticity. Such pipes consist at least in part of plastic bonded pulverant or granular filling material, such as sand, expanded fired clay or the like. Usually, these pipes are made as so-called sandwich pipes where two, usually glass fiber reinforced, outer layers of plastic enclose an inner layer of a plastic bonded filling material. The composition of such pipes is such that plastic and filling material are employed in a substantially constant ratio throughout the wall thickness and the individual layers of the wall consist at most of two materials, for example synthetic resin and glass, or synthetic resin and filling material. It has been found that such pipes cannot meet all requirements as their construction is not versatile, and hence their adaptability is limited. In addition, the production of satisfactory laminated pipes is relatively complicated.

The present invention provides a pipe construction and method of making a pipe which avoids the disadvantages of the prior art. For this purpose, the pipe of the invention comprises over a greater part of its wall thickness a plastic bonded filling material and is characterized in that the proportion of at least one constituent of the filling material is varied at least over a part of the pipe wall thickness as viewed in a radial direction. As filling material there may be provided fiber materials and/or powders and the proportion of one or both materials may be varied radially.

In accordance with the method of the invention, filling material is supplied to a rotating mold in successive strokes along the mold axis, and plastic material is supplied continuously to the mold. The fed quantity of at least one constituent of the filling material is varied during a plurality of successive strokes of application in any selected manner so that the density of the fiber material which is added proceeding in the radial direction will vary. The addition of the filling material may be varied as a function of time or as a function of the number of strokes of application.

Accordingly, it is an object of the invention to provide an improved pipe construction in which the wall is made of a plastic material having fiber or other filling materials therein and wherein the quantities of such filling materials is varied in a radial direction, for example so as to provide for a greater concentration of fiber materials toward the interior wall and exterior wall and a lessening of these fiber materials at the center of the wall thickness.

A further object of the invention is to provide a method of forming a pipe which includes applying a plastic continuously to a rotating mold in order to form the pipe wall with increasing thickness as the mold is rotated and during the application of such plastic to the mold adding a filler material by applying it axially along the length of the mold as the wall of the pipe is being formed and wherein the quantity of the filler is varied such as by varying the number of strokes of the application or the time in which the filling material is applied or by varying the quantity applied during each stoke application.

A further object of the invention is to provide an improved pipe construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

GENERAL DESCRIPTION OF THE PREFERRED EMBODIMENT

Figure 1:
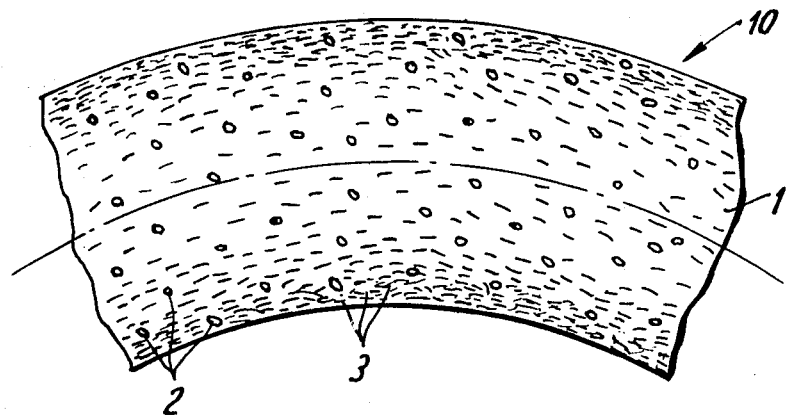
FIG. 1 is a partial sectional view of a pipe constructed in accordance with the invention.
Figure 2:
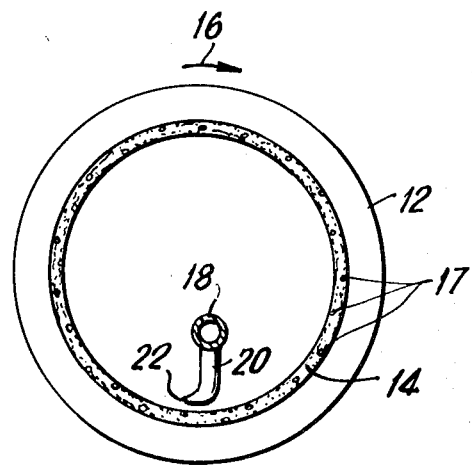
FIG. 2 is an end elevational view, partly in section, of an apparatus for forming the pipe indicated in FIG. 1.

Referring to the drawing in particular, the invention embodied therein comprises a pipe generally designated 10 which is made of three materials, namely a plastic 1, for example a polyester, a granular or pulverant first filler 2, for example sand, quartz sand, grains of slag or expanded fired clay (Lecca beans) or brick powder; and a fibrous second filler 3, for example glass fibers. The filler particles and fibers 2 and 3 are bonded by the plastic acting as a binder to form a solid pipe body. In the example of the drawing, the pipe wall contains all three components 1, 2 and 3 over its entire thickness but as seen radially, the proportions are varied throughout the wall thickness. The pulverant or granular filler 2 is distributed uniformly over the entire wall thickness. The proportion of the fibrous filler decreases from the inner wall towards the wall center and increases again toward the outer wall. Especially when using glass fibers as the fiber material 3, one obtains a pipe highly reinforced in the inner and outer zones and this reinforcement diminishes progressively toward the neutral axis without a layerwise abrupt transition.

The method of making the pipe in accordance with the invention is as follows:

The plastic and filler are supplied continuously to a rotating pipe mold 12 into which is continuously admitted a plastic material 14 while the mold is continuously rotated in the direction of the arrow 16. A filler material feed pipe 18 is moved in an axial direction back and forth within the pipe and it is connected to a discharge conduit 20 which discharges a filler through an open end 22 in the direction of rotation of the mold.

A feature of the method is that the conduit 18 is moved backwardly and forwardly in a controlled manner in order to vary the quantity of filler material which is directed into the plastic 14 forming with the filler the finished pipe. Variations of the quantity of filler may be obtained by varying the stroke of movement of the conduit 18 or by varying the quantity of material filler fed through the pipe 18. Thus, the variation of the distribution of the filler throughout the pipe which is formed may be accomplished as a function of the number of strokes of the conduit 18 while the plastic material 14 is held constant. In addition, quantities of powdered filler 16 may also be added at a constant rate and only fibrous filler material need be directed through the conduit 18 and the discharge nozzle 22 at a varying rate. The fiber material may be varied, for example, to form the pipe of FIG. 1 in which the fiber quantity is varied so that it decreases from the exterior of the wall to be formed to the center and then it increases again to the interior of the pipe. The ratio of the proportions of fiber material which is added on the exterior wall area, the center wall area and the internal wall area may, for example, be 10:1:10 or 2:1:2 or 4:1:10. Thus, the fiber addition may decrease from a first value externally to a second smaller value in the center zone and then increase again internally to the first value or to a smaller or greater value than this first value. Naturally it is also possible to control the fiber addition so that the central zone of the pipe wall receives the greatest quantity of fiber material and that the outer and inner portions receive a lesser amount. In some instances it is also desirable to increase the fiber quantity or to decrease the fiber quantity from the outside to the inside in a direct line proportion.

In certain other instances it may be desirable to use no fiber material as a filling agent but exclusively use a pulverant or granular filler. In this case, the variation of additions of the pulverant or granular filler may be carried out within the same scope as mentioned above. On the other hand, when using two different fillers as in the example of the drawing, the addition of both fillers may be varied so that the pipes of any construction can be obtained.

It is clear that the described pipes can be produced also as so-called sandwich pipes in which they are provided with special internal or external layers. For example, a glass fiber reinforced outer plastic layer having uniform or varying glass fiber distribution is practical and possible. A correspondingly reinforced inner plastic layer may enclose a relatively thick middle layer with a filler proportion varying radially in the same manner.

While a specific embodiment of the invention has been shown and described in detail to illustrate the application of the principles of the invention, it should be understood that the invention may be embodied otherwise without departing from such principles.

What is claimed is:

1. A pipe construction particularly an underground pipe such as a sewer pipe, comprising a cylindrical wall of plastic material bonded over a filler material, said cylindrical wall having a longitudinal axis with a radially inner wall interior and a radially outer wall exterior and a wall center midway between said interior and exterior, the quantity of filler material throughout the length of said pipe varying continuously throughout the radial thickness from said wall interior to said wall exterior.

2. A pipe construction according to claim 1, wherein the filler material proportion varies from a minimum at the center of the wall to a maximum toward the exterior and interior.

3. A pipe construction according to claim 2, wherein said filler material varies from a maximum at the center toward a minimum at the interior and exterior.

4. A pipe construction according to claim 1, wherein the quantity of the filler material varies uniformly from one side of the wall thickness to the other.

5. A pipe construction according to claim 1, wherein the filler material comprises a pulverant material.

6. A pipe construction according to claim 1, wherein the filler material comprises a fibrous filler.

7. A pipe construction according to claim 1, wherein said filler material comprises a pulverant filler and a fibrous filler and wherein at least one of said fillers is varied in quantity throughout the wall thickness.

8. A pipe construction according to claim 1, wherein said filler material comprises a glass fiber.